UNITED STATES PATENT OFFICE.

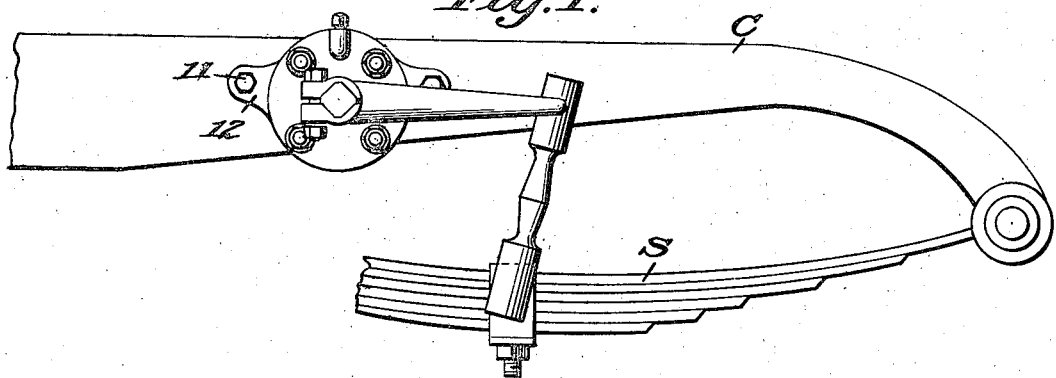
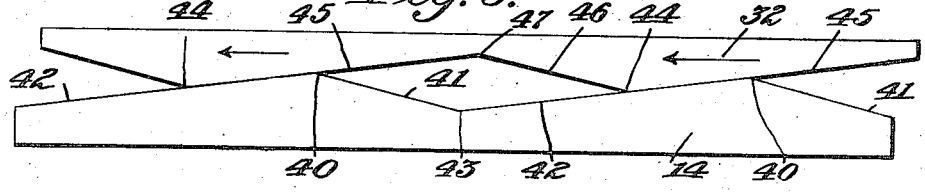
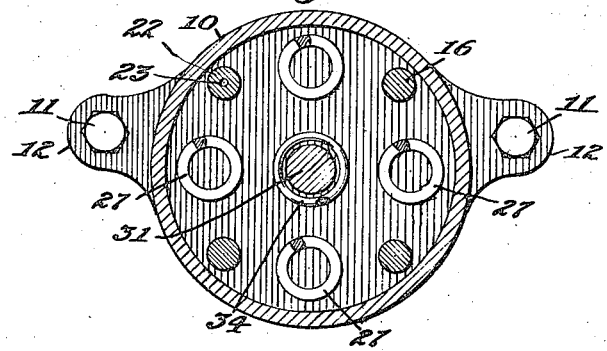

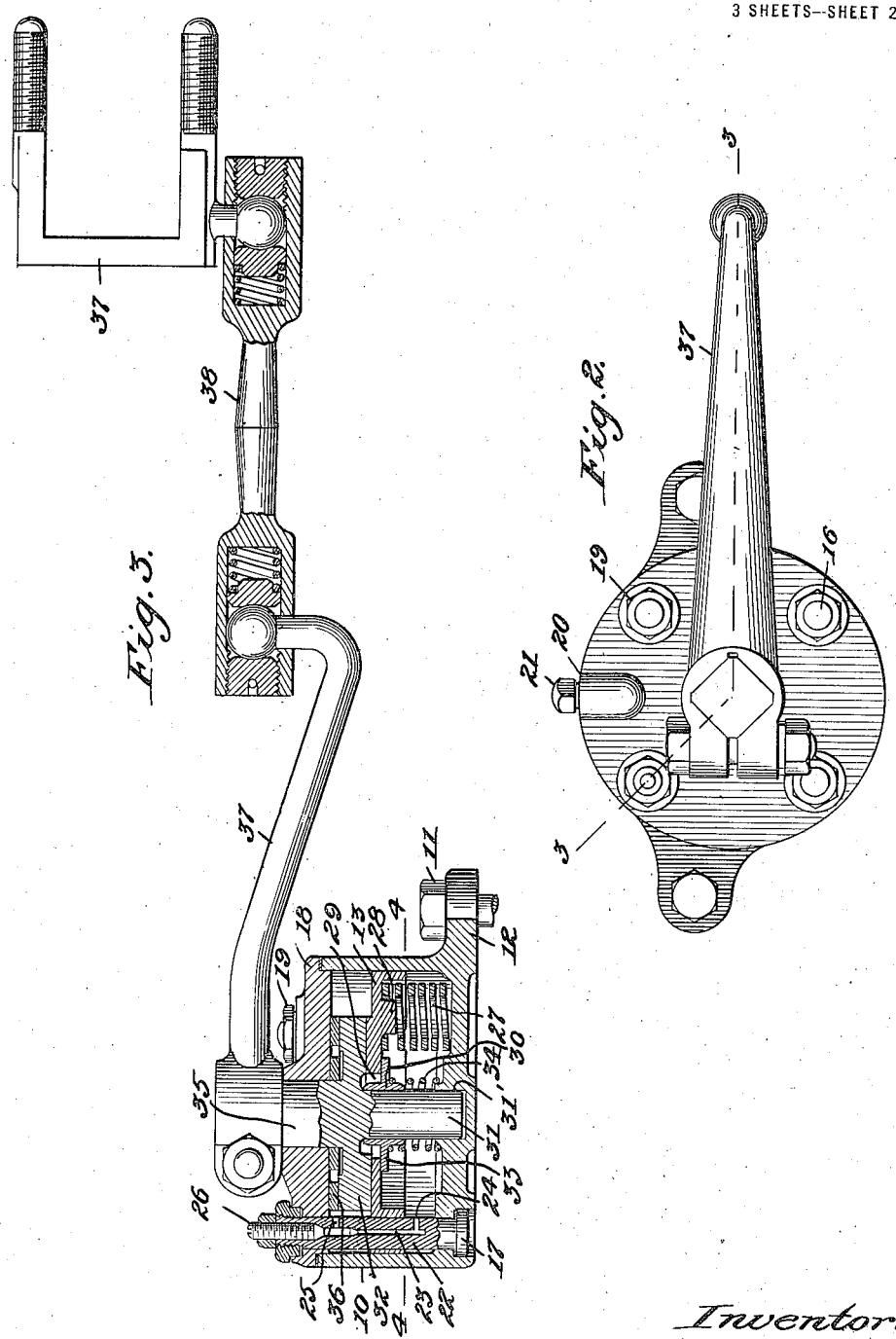

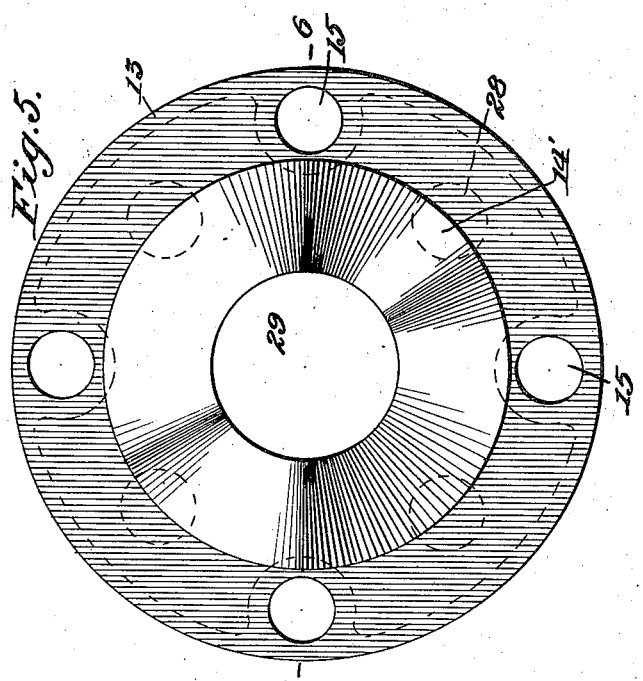
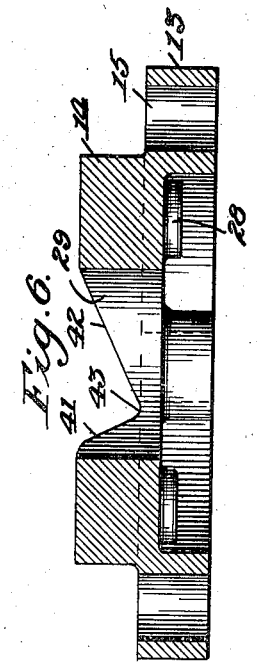
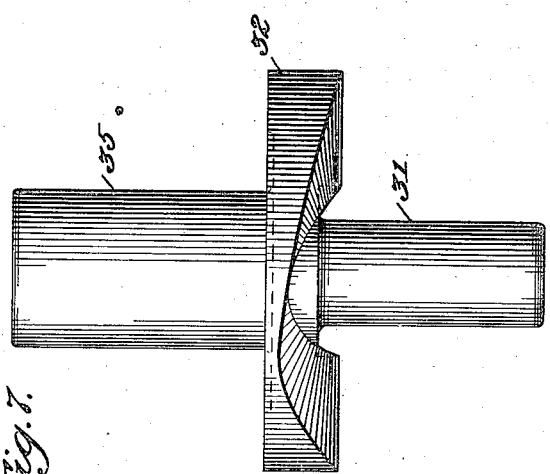
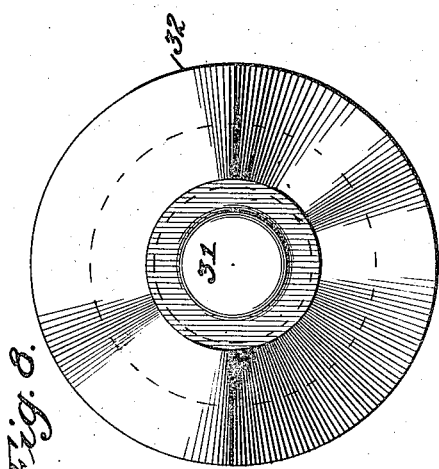

CHARLES H. BROWN, OF INDIANAPOLIS, INDIANA.

SHOCK ABSORBER.

1,425,834.  Specification of Letters Patent.  Patented Aug. 15, 1922.

Application filed October 24, 1921. Serial No. 509,799.

*To all whom it may concern:*

Be it known that I, CHARLES H. BROWN, a citizen of the United States, residing at Indianapolis, in the county of Marion and State of Indiana, have invented new and useful Improvements in Shock Absorbers, of which the following is a specification.

This invention relates to a buffer or shock absorber for the suspension of motor or other vehicles of the type in which a piston moves within a cylinder filled with liquid and forces the liquid through a by-pass from one side of the piston to the other, the by-pass being regulated to vary the resistance of the liquid to the piston by means of a valve therein.

An object of the invention is to provide a shock absorber of the type above described, as distinguished from the friction type of absorber, which has substantially all of the advantages of the improved friction type absorber without the complicated structure and limited durability of the buffer which depends upon friction for its shock absorbing power. More specifically, the invention seeks to provide a fluid resistance absorber which will afford practically no resistance to the action of the vehicle springs as the body moves downwardly until the body is extremely close to the axle and there is danger of the axle being struck, whereupon the absorber provides a relatively quick and severe checking action. In other words, the shock absorber of this invention permits free functioning of the vehicle springs during the initial stages of the downward body movement, and offers no resistance until the latter part of this movement, at which time it functions in order to prevent striking of the vehicle axle. Return movement of the body to its normal position is preferably gradually checked, the absorber offering a gradual but positive resistance to the recoil of the springs except during the initial stage of the return movement if the absorber has applied a checking action to prevent striking of the axle when the body has moved downwardly. If the downward movement of the body has not caused the absorber to apply the severe and quick resistance above mentioned the upward movement is checked by the absorber during every stage, including the initial stage.

Other objects of the invention reside in the general construction of the absorber and the arrangement of its several parts, and have, generally, to do with simplicity, silent and efficient operation and manufacturing economy. The above objects of the invention, and others of a similar nature will become obvious as the description proceeds, there being shown in the accompanying drawings one form of a device in which the invention may be embodied.

In the drawings:—

Fig. 1 is an elevational view showing the absorber applied to a vehicle,

Fig. 2 is an elevational view of the absorber,

Fig. 3 is a sectional view of the fluid containing cylinder on the line 3—3 of Fig. 2.

Fig. 4 is a horizontal section on the line 4—4 of Fig. 3,

Fig. 5 is a face view of the piston,

Fig. 6 is a sectional view of the piston on the line 6—6 of Fig. 5,

Fig. 7 is an elevational view of the piston operating cam,

Fig. 8 is an end view showing the face of the cam, and

Fig. 9 is a diagrammatic view showing the relation of the cams upon the piston and the piston operating disk.

Referring to the drawings for a more detailed description, 10 indicates a cylinder which may be secured to the chassis C, as by means of bolts 11 passing through ears 12 upon the fluid containing cylinder into the chassis frame. Within the cylinder is positioned a piston 13 (Figs. 5 and 6) formed upon its upper face with an annular cam portion 14 and provided with a plurality of spaced marginal openings 15 through which pass guide pins in the form of bolts 16. The bolts 16 are provided with enlarged heads 17 seated within sockets in one end wall of the cylinder and extending through the cylinder and its closing cap 18, nuts 19 upon the end of the bolts serving to maintain the cap 18 in position. It will be noted that the cylinder cap is provided with a laterally opening filling port 20 which may be kept closed, as by a screw plug 21, this port serving to permit the introduction or resistance fluid into the cylinder without removing the cylinder cap.

The pins 16 serve to guide the piston, which has a rectilinear movement within the cylinder, and function to prevent rotation of the piston. One of the studs 22 (Fig. 3)

has a central longitudinal bore 23 having laterally opening communicating ports 24, 25 below and above the piston, respectively, and the passage is controlled by a needle valve 26 threaded into a counter-bore at the upper end of the bolt. The valve has a seat, as will be noted, just below the lateral ports 25, and thus regulates the passage of fluid upwardly through the central bore which serves as a by-pass for the fluid placed during the movement of the piston in the direction of the closed end of the cylinder. The piston may be normally maintained in the position shown in Fig. 3 by a plurality of coil springs 27 abutting the closed end of the cylinder and the rear face of the piston, bosses 28 upon the piston serving to maintain the springs against displacement.

In order to permit the return of fluid, which has been forced through the by-pass 23, without resistance to the movement of the piston back to its normal position, shown in Fig. 3, the piston is provided with a central port 29; and a one-way valve 30 having a sliding movement upon a stud 31 formed upon an operating cam 32 is normally positioned with a peripheral flange 33 closing the port, a spring 34 holding the valve in this position. This spring is considerably lighter than the piston return springs 27, and any fluid which has been forced through the by-pass to the opposite side of the piston from the springs 27 will pass through the port 29 to the main body of the fluid as the piston is returned by the springs 27.

In order to permit the vehicle springs to function freely the piston should preferably be operated by means which will not operate the same and force any of the fluid through the by-pass during the initial stages of the downward vehicle body movement. However, it is desirable that the absorber check the downward movement of the body during its latter stages, or, in other words, as the body approaches the axle, in order to prevent striking of the axle. Moreover, the piston operating means should function during the upward movement of the body under the recoil of the springs so as to prevent the body from being thrown upwardly by the springs beyond its normal riding position. The checking action of the absorber during the return should preferably be a gradual one, while its resistance during the latter stages of the downward body movement must necessarily be a quick, rather severe and positive action.

The cam disk 32 has, upon its under face, a plurality of cams which cooperate with the cams 14 upon the face of the piston. The disk is held in position by the stud 31, which has a bearing in a socket 31' in the end wall of the cylinder, and by a second integral stud 35 which extends through the closing cap 18 to the exterior of the cylinder, a washer 36 being placed between the disk and the cap 18 to prevent leakage. Upon the outer squared end (Fig. 2) of the stud 35 is fixedly clamped an arm 37 which may be connected by means of a link 38 and U-clip 39 to the vehicle spring S. Obviously, upward and downward body movement will result in rotation of the cam disk and its studs, the disk studs having bearings in the cylinder closing cap and end wall. The formation of the cam 14 upon the piston and the operating cam 32 is more clearly shown in Fig. 9, wherein is also illustrated the relative normal relation of the piston and operating cams. Referring to the construction of the piston cam 14 it will be noted that the same is formed with a pair of spaced high points 40 sloping toward the right rather sharply to form inclines 41. The cams incline more gradually toward the left to form more gradual inclines 42 which terminate rather abruptly at the base of the inclines 41, one meeting point being shown at 43 in the development of the cam illustrated in Fig. 9.

The operating cam 32 is formed in substantially the same manner as the piston cam, and has high points 44, gradually inclined surfaces 45, and rather sharply inclined surfaces 46 meeting the sharply inclined surfaces at points 47.

When the body of the vehicle is in normal position the cams are in their relative positions shown in Fig. 9 with the inclined surfaces of the operating cam 32 substantially half way by the gradually inclined surfaces 42 of the piston cam, and downward movement of the body results in rotation of the operating cam disk in the direction of the arrows shown in Fig. 9. During the initial stages of this downward movement the high points 44 of the operating cam are receding from the high points 40 of the piston cam, and the springs 27 are forcing the piston away from the body of fluid behind the piston, any fluid above the piston passing through the port 29 during this movement. Until the gradually inclined surfaces of the two cams are in absolute registry and the high points 44 of the operating cam have reached the low points 43 of the piston cam the absorber offers no resistance to the downward body movement, and the vehicle springs function freely. At this stage of the body movement the springs are usually within one and one-half or two inches of the axle, and it is, therefore, necessary for the absorber to apply a very sharp, severe and positive checking action. Continuation of the downward movement in the direction of the arrows results in the surfaces 46 of the operating cam moving along the sharply inclined surfaces 41 of the piston cam, and the piston is thereupon moved against the body of liquid, which is displaced by the piston and forced through the by-pass 23 to the opposite side of the piston. The resistance which the fluid offers to this movement may be varied by adjusting the needle valve 26 in the by-pass, and this may be readily done since it will be noted that the valve is accessible without opening the cylinder.

Upward movement of the body results in rotation of the operating cam disk in the opposite direction from that indicated by the arrows; and if the checking cam surfaces 41, 46 have been called into play during the downward body movement there is no resistance to the upward movement until the high points 44 of the operating cam reach the low points 43 at the lower extremities of the gradually inclined surfaces 42 of the piston cam. It should be borne in mind that any fluid which may have been forced through the by-pass during the downward body movement has, by this time, returned through the port 29 to the main body of fluid behind the piston, the return taking place while the piston is returning to its normal position under the influence of the springs 27, which it does while the high points 44 of the operating cam are approaching the low points 43 of the piston cam during the initial stages of the upward body movement. Continuation of the upward body movement results in the gradually inclined surfaces 45 of the operating cam moving upwardly along the gradually inclined surfaces 42 of the piston cam, and the piston is thus gradually and slowly moved against the body of liquid to force the same through the by-pass to the opposite side of the piston.

It is thought that the operation of this device will be entirely clear from the above description, and that it will be appreciated that the use of this device permits the use of more flexible vehicle springs, since it positively prevents the clash of the frame and axle when the vehicle is over-loaded. It is highly desirable, upon motor vehicles, to employ rather flexible springs, but when such springs are used there is always the danger of the frame and axle striking when the vehicle is overloaded, or when the vehicle is traveling over rather rough roads. Attention is also called to the absolute freedom of vehicle spring action which this absorber affords, while at the same time protecting the vehicle in the manner above set forth.

It should be understood that numerous modifications may be made in the structure illustrated and described, the above detailed disclosure being merely illustrative and in no sense restrictive of the invention.

I claim:

1. In a shock absorber of the class described, the combination of a fluid containing cylinder, a reciprocable piston in the cylinder, means in said cylinder for guiding said piston and preventing rotary movement of the same, a rotatable cam member for moving said piston, and a by-pass permitting displacement of the fluid from one side to the other of said piston.

2. In a shock absorber of the class described, the combination of a fluid containing cylinder, a non-rotatable rectilinearly movable piston in the cylinder, a rotatable cam member for moving said piston, and a by-pass permitting displacement of the fluid from one side to the other of said piston.

3. In a shock absorber, the combination of a fluid containing cylinder, a piston in the cylinder, and movable means for actuating said piston to displace the fluid, said means not functioning to move the piston and to displace the fluid during the initial stages of its movement in one direction.

4. In a shock absorber, the combination of a fluid containing cylinder, a piston in the cylinder, and movable means for actuating said piston to displace the fluid, said means not functioning to move the piston and to displace the fluid during the initial stages of its movement in one direction, but operative to produce relatively quick piston actuation during a continuation of its movement in the same direction.

5. In a shock absorber, the combination of a fluid containing cylinder, a piston in the cylinder, and movable means for actuating said piston to displace the fluid, said means not functioning to move the piston and to displace the fluid during the initial stages of its movement in one direction, but operative to produce relatively quick piston actuation during a continuation of its movement in the same direction and effective to produce piston movement and fluid displacement during its movement in the opposite direction.

6. In a shock absorber, the combination of a fluid containing cylinder, a piston in the cylinder, and movable means for actuating said piston to displace the fluid, said means not functioning to move the piston and to displace the fluid during the initial stages of its movement in one direction, but operative to produce relatively quick piston actuation during a continuation of its movement in the same direction and effective to produce relatively gradual piston movement and fluid displacement in the same direction during its movement in the opposite direction.

7. In a shock absorber of the class described, the combination of a fluid containing cylinder, a rectilinearly movable piston in the cylinder adapted to displace the fluid therein, a cam disk in the cylinder for moving the piston, complementary cam means associated with said piston, the cams being effective upon relative rotation of the disk and piston in one direction to produce operation of the piston and fluid displacement only after the initial stages of the movement.

8. In a shock absorber of the class described, the combination of a fluid containing cylinder, a rectilinearly movable piston in the cylinder adapted to displace the fluid therein, a cam disk in the cylinder for moving the piston, complementary cam means associated with said piston, the cams being effective upon relative rotation of the disk and piston in one direction to produce operation of the piston and fluid displacement only after the initial stages of the movement, the piston operation being then relatively quick.

9. In a shock absorber of the class described, the combination of a fluid containing cylinder, a rectilinearly movable piston in the cylinder adapted to displace the fluid therein, a cam disk in the cylinder for moving the piston, complementary cam means associated with said piston, the cams being effective upon relative rotation of the disk and piston in one direction to produce operation of the piston and fluid displacement only after the initial stages of the movement, the piston operation being then relatively quick, and during relative rotation in the opposite direction being effective to produce relatively gradual piston movement and fluid displacement.

10. A shock absorber of the class described comprising a fluid containing cylinder, a piston in said cylinder, cam means for moving said piston to displace the fluid from one side to the other of said piston, a by-pass in said cylinder to permit displacement of the fluid upon actuation of the piston, means for regulating the size of said by-pass to vary the fluid resistance, means for returning said piston to a normal position, and a one-way valve permitting return of said fluid without resistance to the return of said piston.

11. A shock absorber of the class described comprising a fluid containing cylinder, a piston in the cylinder having a rectilinear movement, means for guiding said piston and preventing rotation thereof, said means comprising a plurality of studs extending through the piston adjacent the wall of the cylinder, one of said studs having a central bore provided with an inlet on one side of said piston and an outlet on the other side of the piston, and a rotatable cam for moving said piston.

12. A shock absorber of the class described comprising a fluid containing cylinder, a piston in the cylinder having a rectilinear movement, means for guiding said piston and preventing rotation thereof, said means comprising a plurality of studs extending through the piston adjacent the wall of the cylinder, one of said studs having a central bore provided with an inlet on one side of said piston and an outlet on the other side of the piston, said piston having a port therein permitting return of the fluid which has been forced through said by-pass, a one-way valve controlling said port, an adjustable valve in said by-pass for varying the resistance of the fluid, and a rotatable cam for moving said piston.

13. A shock absorber of the class described comprising a fluid containing cylinder, a piston in said cylinder, guide studs in the cylinder for said piston preventing rotation of the piston, one of said studs having a central bore serving as a fluid by-pass, a rotatable cam disk in the cylinder, complementary cams on said piston, said disk having a bearing stud extending through an end wall of the cylinder, and a second stud extending through said piston having a bearing in the opposite end wall of the cylinder, an adjustable valve for regulating said by-pass, said piston having a port therein to permit the return of fluid displaced by the piston, and a one-way valve controlling said port.

14. A shock absorber of the class described comprising a fluid containing cylinder, a piston in said cylinder, guide studs in the cylinder for said piston preventing rotation of the piston, one of said studs having a central bore serving as a fluid by-pass, a rotatable cam disk in the cylinder, complementary cams on said piston, said disk having a bearing stud extending through an end wall of the cylinder, and a second stud extending through said piston having a bearing in the opposite end wall of the cylinder, an adjustable valve for regulating said by-pass, said piston having a port therein to permit the return of fluid displaced by the piston, and a one-way valve upon said second stud and controlling said port.

In testimony whereof I have hereunto set my hand.

CHARLES H. BROWN.